March 15, 1966 J. Y. RESNICK 3,239,879
APPARATUS FOR BLOW MOLDING HOLLOW ARTICLES
Filed June 8, 1962 16 Sheets-Sheet 1
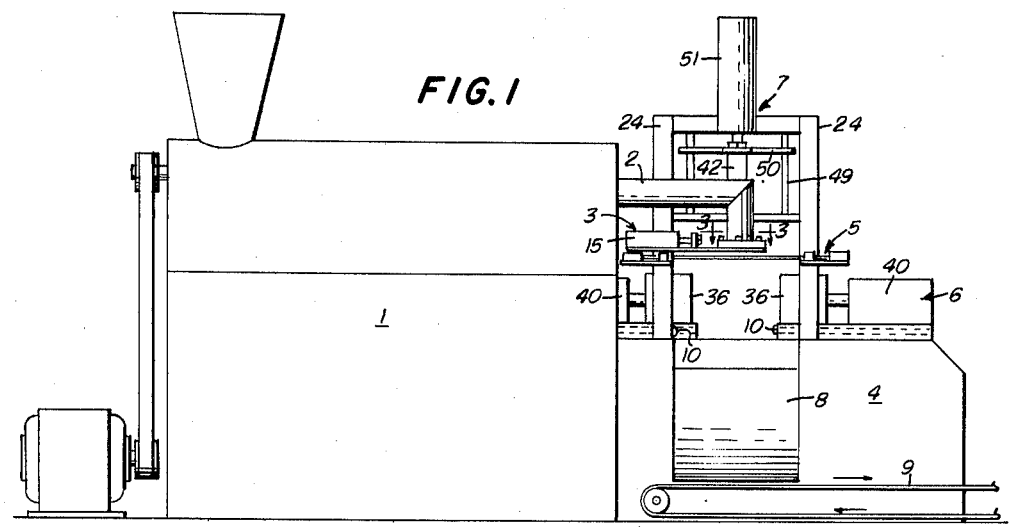
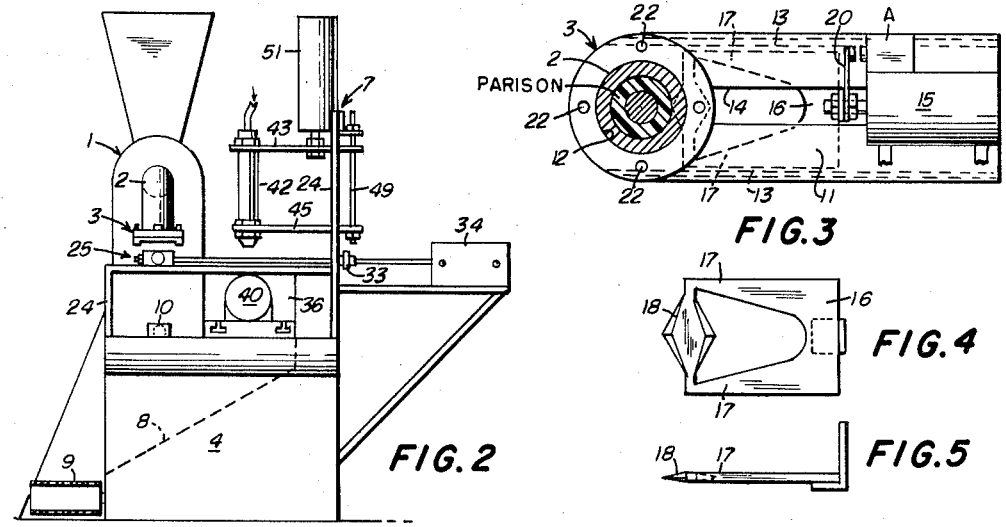
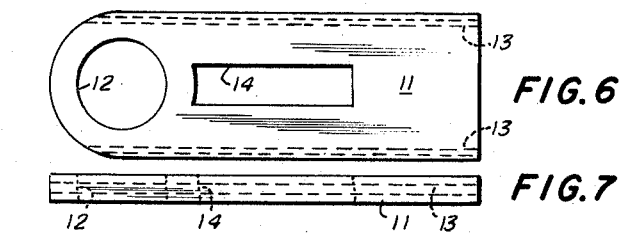
INVENTOR
JOSEPH Y. RESNICK
BY *Fisher, Christen, Sabol & Caldwell*
ATTORNEY March 15, 1966 J. Y. RESNICK 3,239,879
APPARATUS FOR BLOW MOLDING HOLLOW ARTICLES
Filed June 8, 1962 16 Sheets-Sheet 2
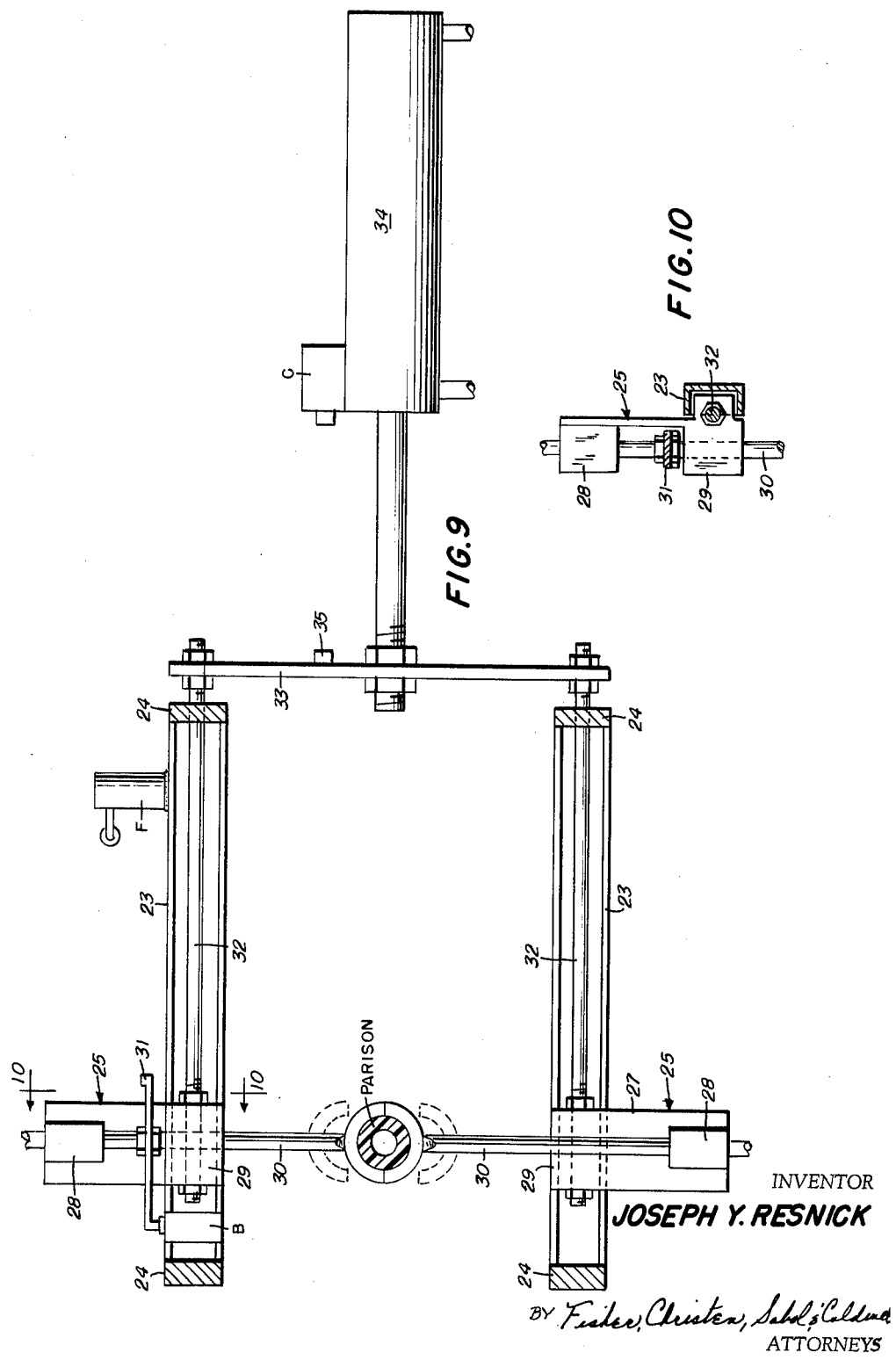
INVENTOR
JOSEPH Y. RESNICK
ATTORNEYS March 15, 1966  J. Y. RESNICK  3,239,879
APPARATUS FOR BLOW MOLDING HOLLOW ARTICLES
Filed June 8, 1962  16 Sheets-Sheet 3
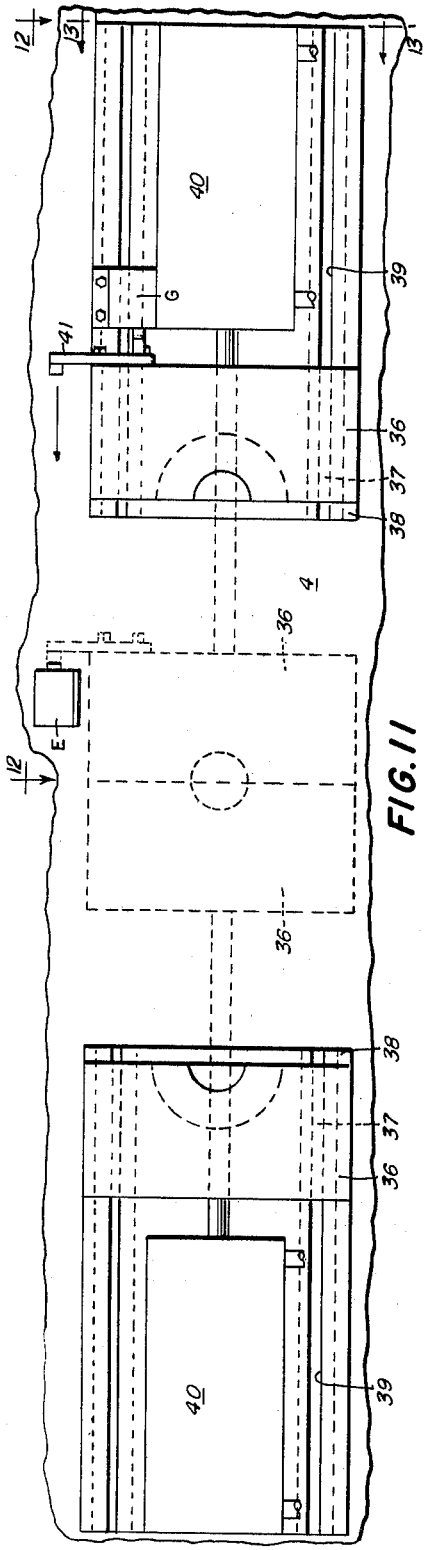
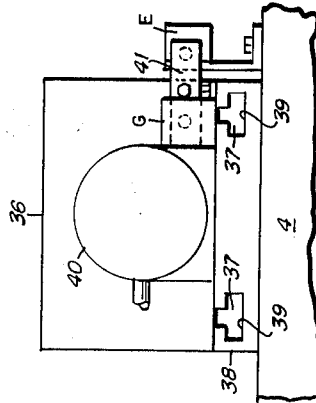
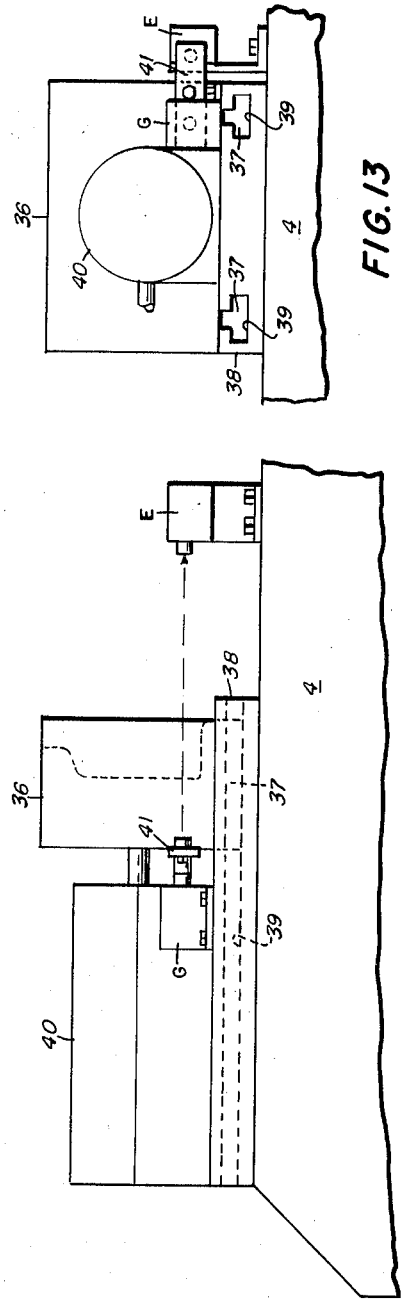
INVENTOR
JOSEPH Y. RESNICK
BY Fisher, Christen, Sabol & Caldwell
ATTORNEYS March 15, 1966    J. Y. RESNICK    3,239,879
APPARATUS FOR BLOW MOLDING HOLLOW ARTICLES
Filed June 8, 1962    16 Sheets-Sheet 4
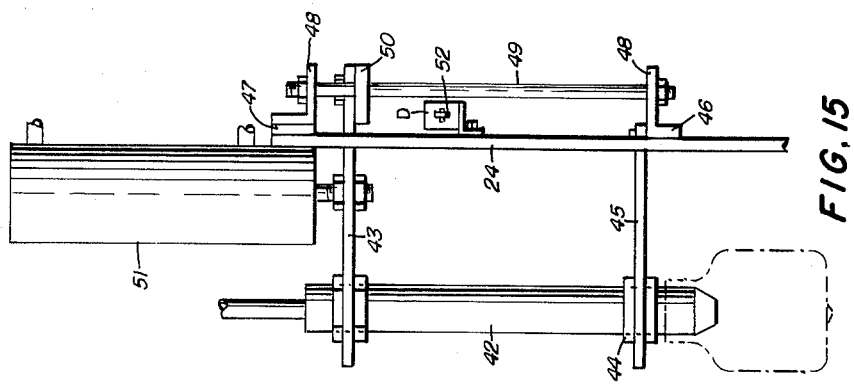
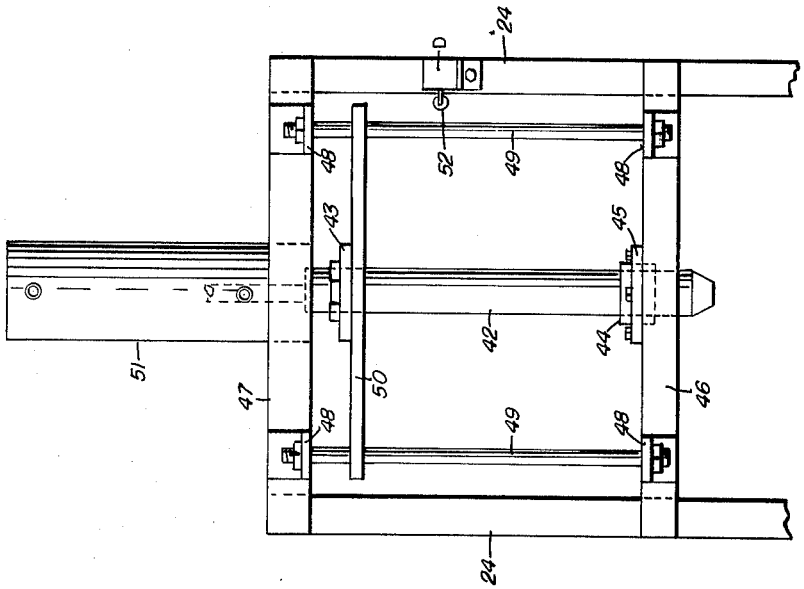
INVENTOR
JOSEPH Y. RESNICK
BY *Fisher, Christen, Sabol & Caldwell*
ATTORNEYS March 15, 1966  J. Y. RESNICK  3,239,879
APPARATUS FOR BLOW MOLDING HOLLOW ARTICLES
Filed June 8, 1962  16 Sheets-Sheet 5
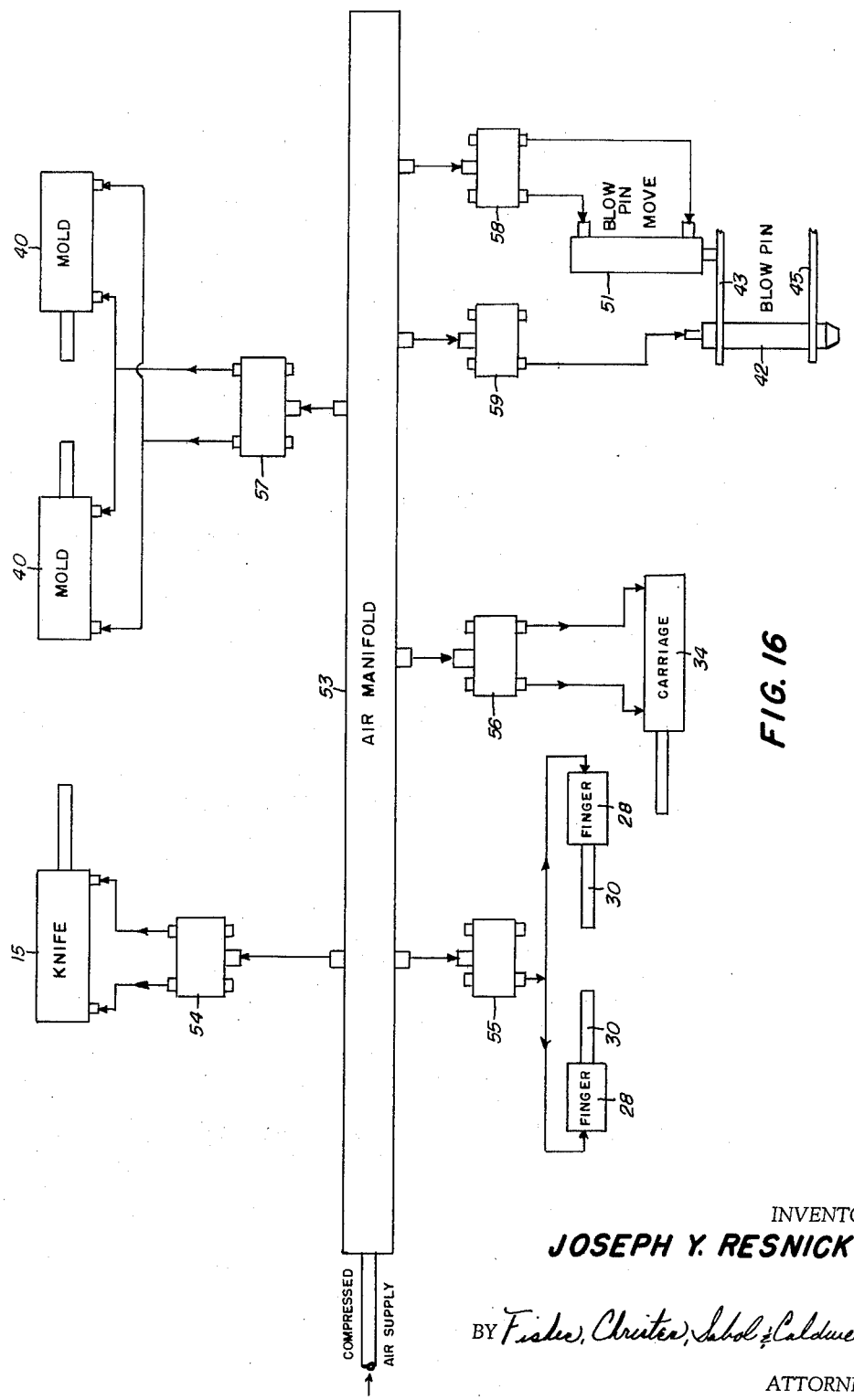
INVENTOR
*JOSEPH Y. RESNICK*
BY *Fisher, Christen, Sabol & Caldwell.*
ATTORNEYS

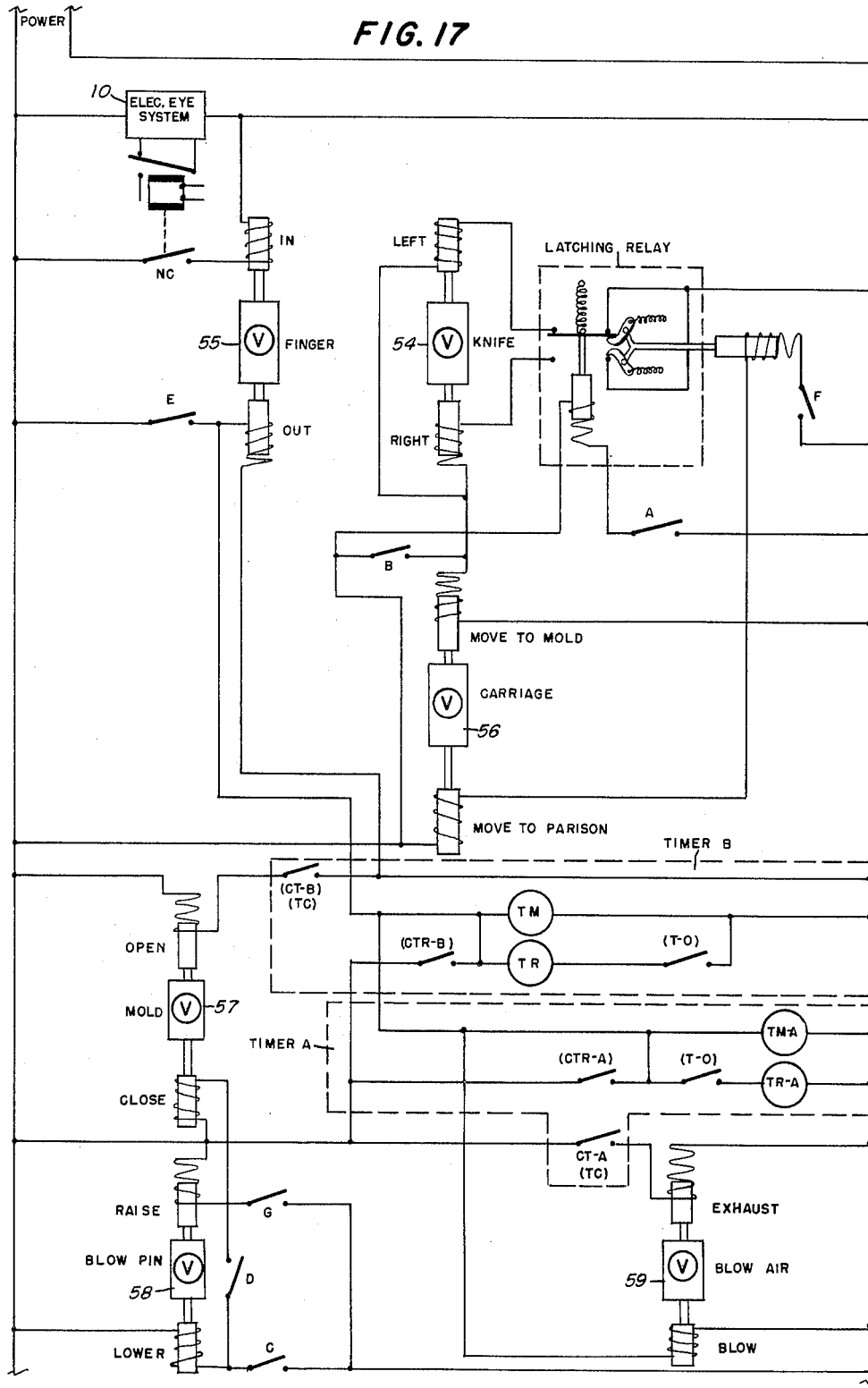

March 15, 1966  J. Y. RESNICK  3,239,879
APPARATUS FOR BLOW MOLDING HOLLOW ARTICLES
Filed June 8, 1962  16 Sheets-Sheet 7

INVENTOR
JOSEPH Y. RESNICK

BY *Fisher, Christen, Sabol & Caldwell*

ATTORNEYS

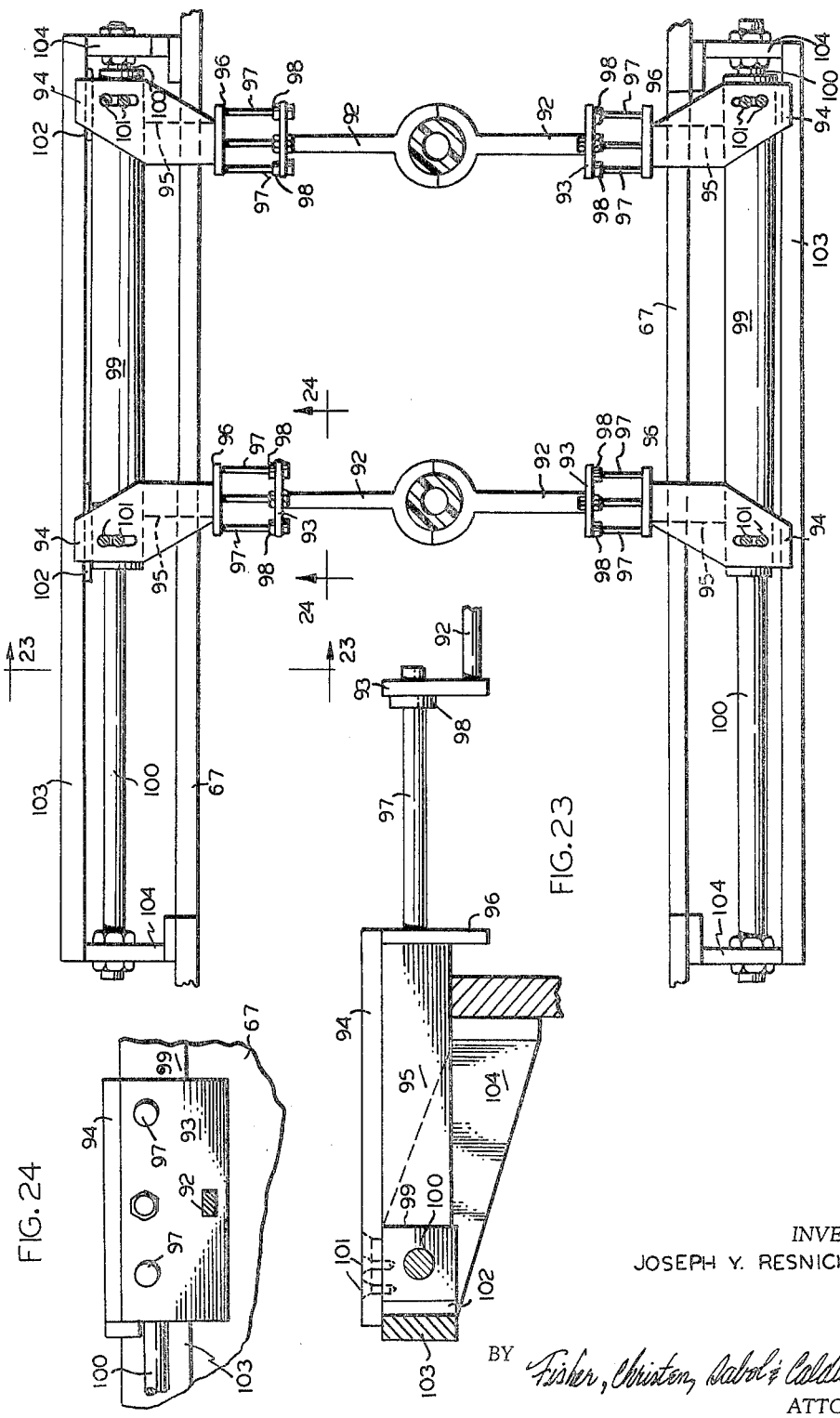

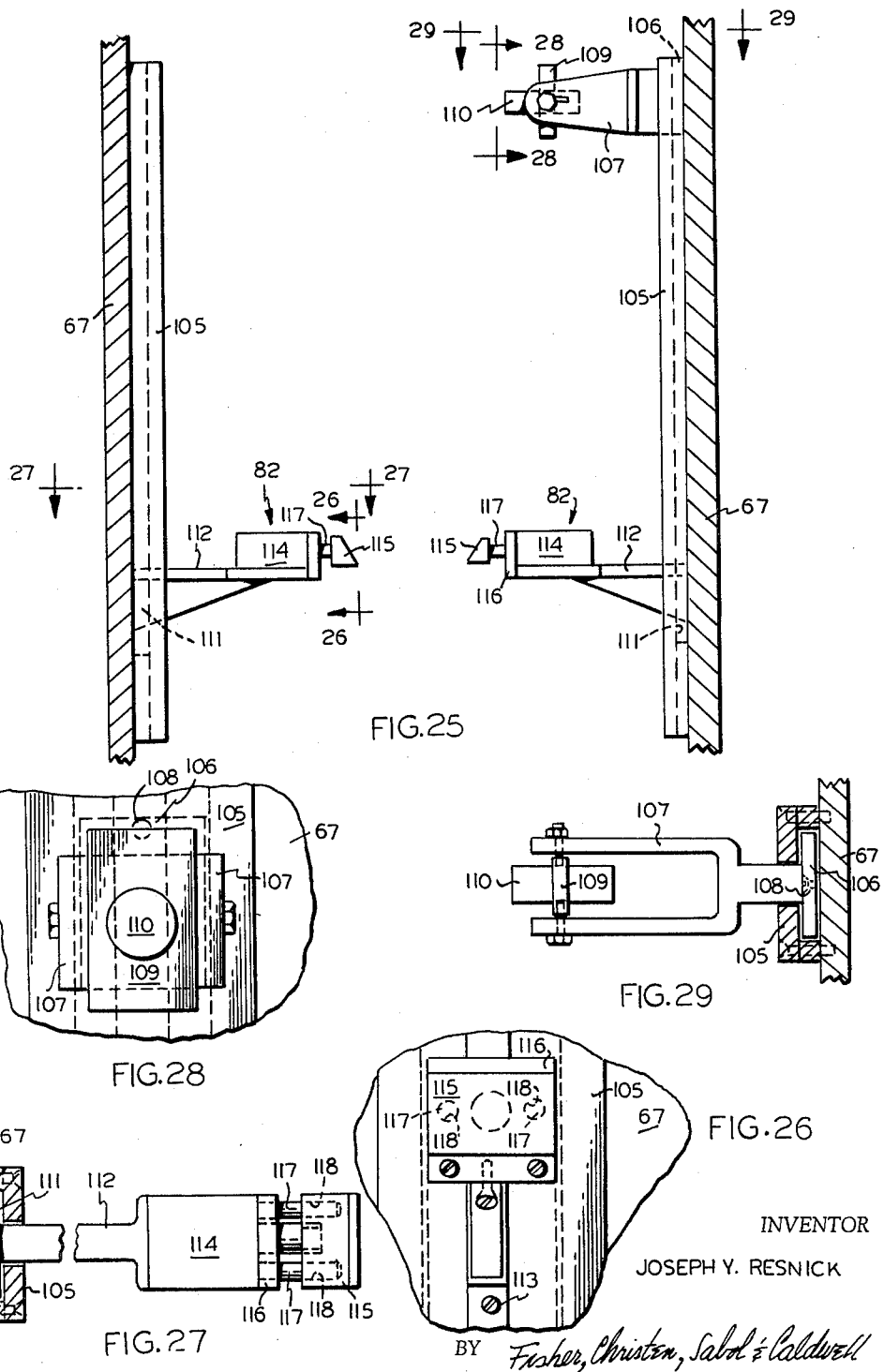

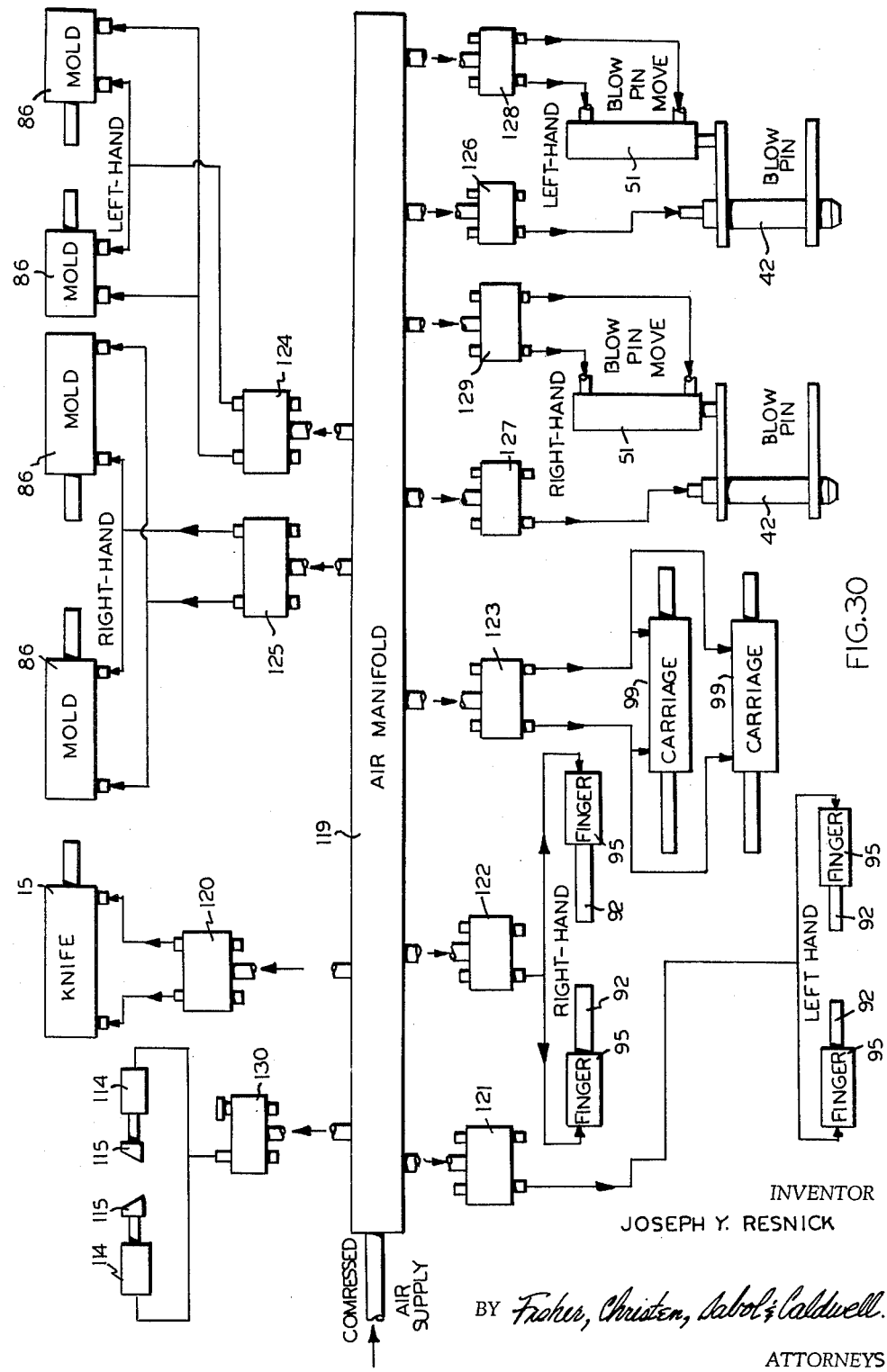

March 15, 1966  J. Y. RESNICK  3,239,879
APPARATUS FOR BLOW MOLDING HOLLOW ARTICLES
Filed June 8, 1962  16 Sheets-Sheet 14

INVENTOR
JOSEPH Y. RESNICK

BY Fisher, Christen, Sabol & Caldwell
ATTORNEYS

March 15, 1966   J. Y. RESNICK   3,239,879
APPARATUS FOR BLOW MOLDING HOLLOW ARTICLES
Filed June 8, 1962   16 Sheets-Sheet 15

INVENTOR
JOSEPH Y. RESNICK

BY *Fisher, Christen, Sabol & Caldwell*
ATTORNEYS

March 15, 1966     J. Y. RESNICK     3,239,879
APPARATUS FOR BLOW MOLDING HOLLOW ARTICLES
Filed June 8, 1962                         16 Sheets-Sheet 16
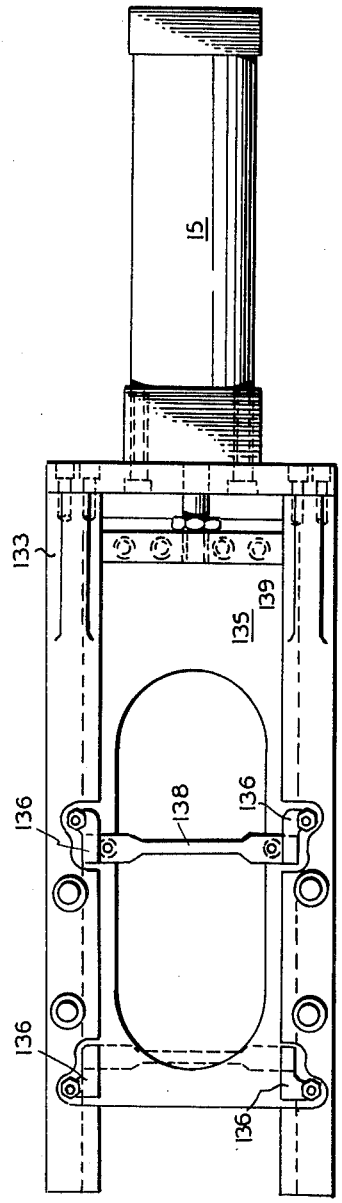
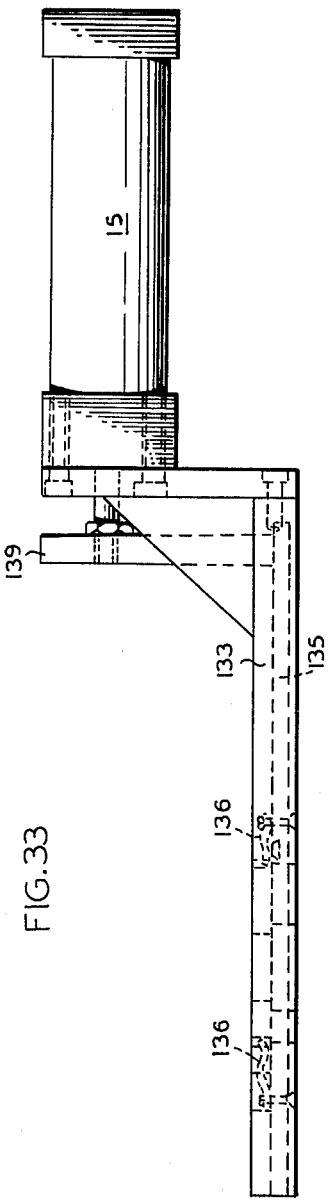
INVENTOR
JOSEPH Y. RESNICK
BY *Fisher, Christen, Sabol & Caldwell*
ATTORNEYS

United States Patent Office 3,239,879
Patented Mar. 15, 1966

3,239,879
APPARATUS FOR BLOW MOLDING HOLLOW ARTICLES
Joseph Y. Resnick, Ellenville, N.Y., assignor to Questron America, Inc., Ellenville, N.Y., a corporation of New York
Filed June 8, 1962, Ser. No. 201,058
7 Claims. (Cl. 18—5)

This invention relates to molding machines and, more particularly, relates to automatic machines and methods for blow molding hollow articles.

Many complex machines were known heretofore for blow molding plastic materials to manufacture hollow articles. These prior machines are of a complex nature and, for the most part, comprised an extruder or injection system for forming a parison of sufficient plasticity to permit deformation by blowing and thereafter setting by cooling. In general, the molds of the prior machines were moved to the parison where they were charged with a length of parison and then they were moved away from the parison for blowing and cooling. Alternatively, some other prior machines moved the extruder or injection system from one mold to another or provided more than one extruder nozzle or injection nozzle and a switching means for directing the flow of plastic material from one nozzle to the other. Regardless of the precise means for charging the molds with parison, the prior machines were all subject to the disadvantage of requiring the expenditure of large amounts of energy in either moving the molds or in moving the extruder nozzles or injection nozzles. Those prior machines where the plastic material is directed by switching means to one of several nozzles were subject to the disadvantages of loss of plasticity of the plastic material, causing the creation of stresses and strains in the parison which stresses and strains resulted in weak points in the subsequently produced hollow articles and incurred increased costs for die heads and switching means which required close internal tolerances.

In addition to the above disadvantages of the prior machines, it has been the customary procedure, in many cases, to perform the blowing operation by inserting a blow pin through the bottom end of a parison length disposed within a mold. Such procedures were disadvantageous in that the bottom of the hollow article being produced was made from the upper portions of a parison length and tended to be weakened because of thinning of the upper portions of the parison length by the normal gravity flow of the plastic material comprising the parison length. Additionally, such prior procedures gave rise to difficulties in ejecting the finished hollow article from the blow pin and removal thereof from the blow molding machinery.

It is therefore a principal object of this invention to provide machines for forming hollow articles by means of blowing, which machines and methods are characterized by high efficiency and simplicity of operation.

Another object of this invention is to provide blow molding machines which require low energy input and which avoid unnecessary movements of molds and other heavy elements.

Another object is the provision of novel blow molding machines having the above-mentioned characteristics and which are capable of producing high quality hollow articles free of weak points.

A further object is the provision of blow molding machines characterized by extremely high production outputs and by low energy inputs.

Another object is the provision of machines for producing hollow articles, which machines are capable of being readily adapted to or modified for producing a wide variety of different types and sizes of hollow articles.

A further object and advantage is to provide blow molding machines comprised of readily replaceable parts adapted for easy removal and repair apart from the machine as a whole and adapted for easy substitution to greatly reduce the down time of the machine necessary for repairs.

Further objects and advantages of this invention will be apparent from the following description taken in conjunction with the appended drawings, in which:

FIG. 1 is a side elevation of one embodiment of the machine;
FIG. 2 is an end elevation of the embodiment shown in FIG. 1;
FIG. 3 is a sectional view substantially on line 3—3 of FIG. 1 illustrating the severing means;
FIG. 4 is a plan of the knife blade assembly employed in the severing means of FIG. 3;
FIG. 5 is a side elevation of the knife blade assembly shown in FIG. 4;
FIG. 6 is a plan of the support platform and knife blade slide track of the severing means;
FIG. 7 is a side elevation of the support platform shown in FIG. 6;
FIG. 8 is an end elevation of the platform shown in FIG. 6;
FIG. 9 is a plane view of the finger transverse system and gripping finger assembly of the embodiment shown in FIG. 1;
FIG. 10 is a sectional view on line 10—10 of FIG. 9;
FIG. 11 is a plan view in cutaway of the mold halves and mold closing and opening system of the embodiment shown in FIG. 1;
FIG. 12 is a sectional view taken substantially on line 12—12 of FIG. 11;
FIG. 13 is a sectional view taken on line 13—13 of FIG. 11;
FIG. 14 is an end elevation of the blow pin and actuating means of the embodiment shown in FIG. 1;
FIG. 15 is a side elevation of the blow pin and actuating means shown in FIG. 14;
FIG. 16 is a pneumatic diagram showing the air supply system for the various pneumatic cylinders employed in the embodiment shown in FIG. 1;
FIG. 17 is a wiring diagram of the control system of the embodiment shown in FIG. 1;
FIG. 18 is a schematic diagram illustrating an alternate control system for the embodiment shown in FIG. 1;
FIG. 19 is a perspective view of another embodiment of the invention;
FIG. 20 is a side elevation of the embodiment shown in FIG. 19;
FIG. 21 is a front elevation of the embodiment shown in FIG. 19;
FIG. 22 is a plan view of the gripping finger traverse system of the embodiment shown in FIG. 19;
FIG. 23 is a sectional view taken on line 23—23 of FIG. 22;
FIG. 24 is a sectional view taken on line 24—24 of FIG. 22;
FIG. 25 is a sectional view taken on line 25—25 of FIG. 21;
FIG. 26 is a sectional view taken on line 26—26 of FIG. 25;
FIG. 27 is a sectional view taken on line 27—27 of FIG. 25;
FIG. 28 is a sectional view taken on line 28—28 of FIG. 25;
FIG. 29 is a sectional view taken on line 29—29 of FIG. 25;
FIG. 30 is a schematic diagram illustrating the pneumatic system for the embodiment shown in FIGS. 19 through 29;

FIG. 33 is a plan view of a cutter assembly which can be employed in the embodiment shown in FIGS. 19, 20, and 21; and FIG. 34 is a side elevational view of the cutter assembly shown in FIG. 33.

Figure 18:
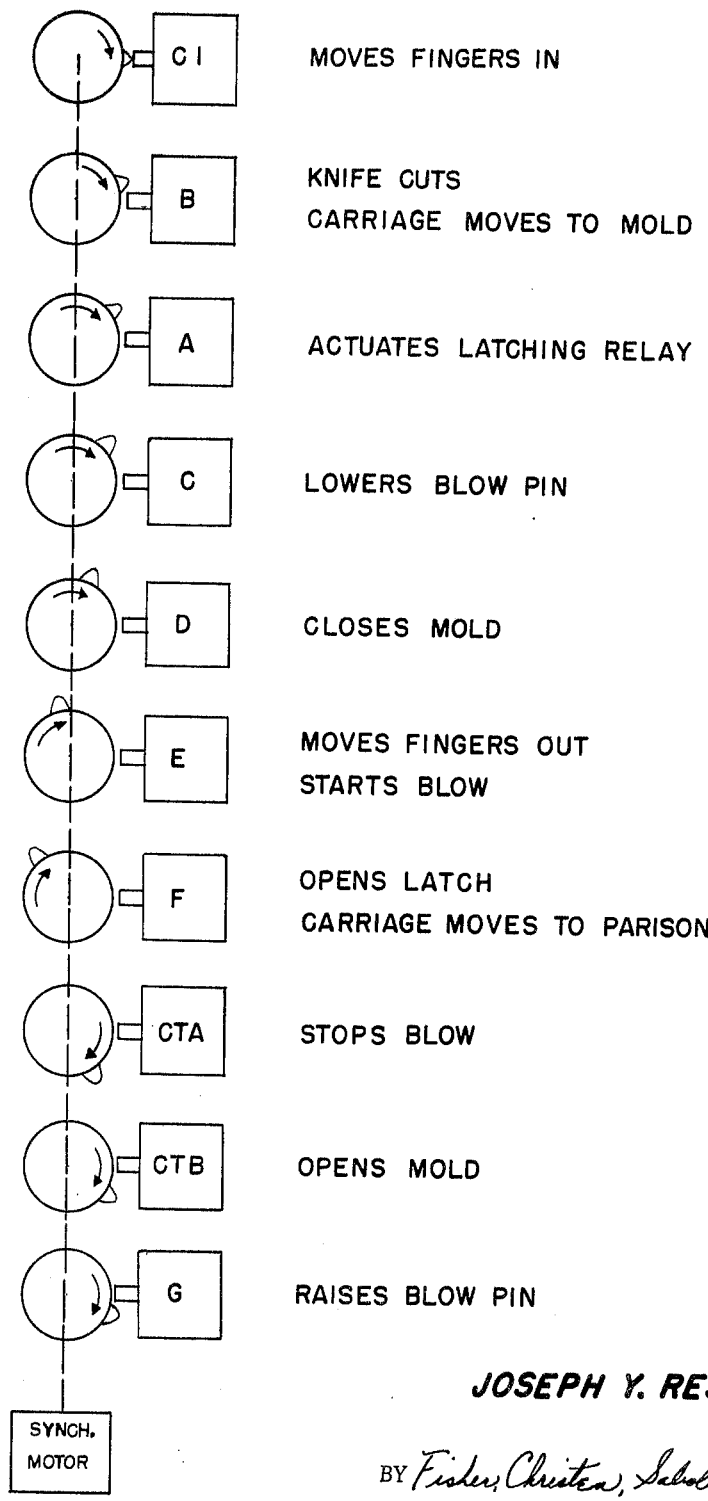

In a broad aspect, the invention comprises means for substantially continuously supplying tubing of plastic material in a condition of plasticity to permit expansion and setting in predetermined form, means for gripping a predetermined length of said tubing, means disposed between the gripping means and the supplying means for severing the length of tubing from the tubing being supplied, mold means positioned adjacent said supplying means for enclosing the length of tubing, means for moving said gripping means after said length has been severed from the tubing being supplied to dispose the length gripped thereby in the mold means, and blowing means insertable into the interior of the length of tubing for expanding it to the confines of the mold means. In other respects, the invention also includes additional means for controlling the various means described above and also means enabling automatic operation.

The novel method of this invention in a broad aspect comprises the steps of supplying a substantially continuous tubing of plastic material in a condition of plasticity to permit expansion and setting in predetermined form, gripping and severing a length of tubing from the tubing being supplied in such a manner that the end of the severed length remains open, transferring the severed length to a mold and expanding it to the confines of the mold by applying fluid under pressure through an open end of the severed length. In other respects, the method of this invention includes the continuous method of converting a plastic material into hollow articles.

Referring now to FIGS. 1 and 2, there is shown an extruder 1, which may be of any conventional type, having an extrusion nozzle 2 directed downwardly. On the open end of the extrusion nozzle 2 there is attached a cutting assembly 3. A table 4 is positioned below the extrusion nozzle 2 and supports a gripping finger assembly 5, a mold assembly 6 and a blow pin assembly 7. The table 4 is also formed with a conveying chute 8 for delivering finished hollow articles to a conveyer belt 9 positioned alongside said table. An electric eye transmitter and receiver 10 are mounted on the table 4 directly below the extrusion nozzle 2 such that the extrudate or parison, when it becomes long enough, breaks the electric eye circuit between the transmitter and receiver 10.

The cutting assembly 3 is shown in detail in FIGS. 3 through 8. Referring to FIG. 3, there is shown a main platen 11 which is formed with a circular hole 12 at one end thereof, which hole is of a sufficient size to fit around the extrusion nozzle 2. The main platen 11 is also formed on its under side with horizontal channels 13 and is formed with a longitudinal slot 14 through the intermediate portions thereof. A knife actuating fluid cylinder 15 is mounted on the upper side of the platen 11 at the end opposite the circular hole 12. A knife member 16 is formed with a pair of arms 17 and a cutting blade 18 extending between and attached to the outer ends of said arms. The knife member 16 is adapted to be slidably mounted in the channels 13 of the main platen 11. An angle bracket 19 is attached to the end of the knife member 16 opposite from the cutting blade 18 and extends upwardly through the slot 14 when the knife member 16 is slidably mounted in the channels 13. The piston rod of the fluid cylinder 15 and a microswitch contact arm 20 are bolted to the upper end of the angle bracket 19. A microswitch A is mounted on the platen 11 in alignment with contact of contact arm 20. The cutting assembly 3 is provided with suitable means such as bolt holes 22 for mounting the assembly on the extrusion nozzle 2.

The gripping finger assembly 5 is shown in detail in FIGS. 9 and 10 wherein there is illustrated a pair of tracks 23 disposed in parallel spaced relationship. The tracks 23 are mounted on uprights 24 on either side of the extrusion nozzle 2. A carriage assembly 25 is slideably mounted in each of the tracks 23. The carriage assembly 25 is formed with a leg 26 which terminates in roller bearings which engage the bottom of the track as best shown in FIG. 10. The carriage assembly 25 is also formed with an arm 27 which mounts a finger actuating fluid cylinder 28 and is formed with a finger bearing 29 above the leg 26. A finger 30 extends through the finger bearing 29 and is connected to the piston rod of the cylinder 28. One of the carriage assemblies 25 has a microswitch double contact arm 31 attached to the piston rod of its associated cylinder. An actuating rod 32 is connected to each leg 26 of each carriage assembly 25 and passes through the upright at one end of the track 23. Tie bar 33 is connected to the free end of each actuating rod 32 and is connected to the piston rod of a carriage actuating fluid cylinder 34. A microswitch B is mounted on one of the tracks 23 at the end opposite from the tie bar 33 and is in alignment for co-action with a contact of the double contact arm 31 when the fingers 30 are disposed directly beneath the extrusion nozzle 2. A microswitch C is mounted on the cylinder 34 and is aligned for co-action with a contact 35 mounted on the tie bar 33. A microswitch F is mounted on the track 23 carrying the microswitch B and is aligned for co-action with the other contact of double contact arm 31 when the carriage assemblies 25 are closest to the cylinder 34 and the fingers 30 move away from each other.

FIGS. 11 through 13 illustrate in detail the mold assembly 6. There is shown a pair of mold halves 36 aligned for cooperation to form a closed mold. The mold halves 36 have T-bars 37 mounted on their lower surfaces. A guide platen 38 is mounted on the table 4 beneath each mold half and is formed with a pair of longitudinal grooves 39 having cross sections in the form of a T which are adapted to receive the T-bars 37 mounted in the lower surfaces of the mold halves 36. The guide platens 38 are aligned such that the mold halves 36 are guided by means of the T-bars 37 cooperating with the grooves 39 to bring the mold halves 36 together forming a closed mold. A mold actuating fluid cylinder 40 is mounted on the platen 38 behind each mold half 36 and has its piston rod connected to its associated mold half. The T-bars 37 and/or the grooves 39 can be provided with suitable lubricating surfaces such as any of the well-known lubricating oils or Teflon. A microswitch G is mounted on a platen 38 alongside its associated cylinder 40 and is aligned with a microswitch double contact arm 41 mounted on the mold half 36 associated with the platen 38 on which the microswitch G is mounted. A microswitch E is mounted on the table 4 adjacent the path of travel of the mold half 36 which is associated with the microswitch G at a position where it will be actuated by contact with double contact arm 41 when the mold halves 36 are closed, as shown by the dash lines in FIG. 11.

FIGS. 14 and 15 illustrate in detail the blow pin assembly 7 which comprises a blow pin 42 which is fixedly mounted on a cross bar 43 and which is guided through a fixed bearing 44. The fixed bearing 44 is mounted on a bracket 45 attached to a lower cross member 46 extending between uprights 24 at the mold end of the table 4. An upper cross member 47 is mounted on the upper end of uprights 24. On the opposite sides of the cross members 46 and 47 from the blow pin 42 there are mounted two pairs of vertically aligned angle members 48. Each angle member 48 is provided with a bore which is aligned with the bore of the corresponding vertically aligned angle member 48. A guide rod 49 passes through each aligned bore of each pair of angle members 48 and is mounted on said pair of angle members by means of bolts. A horizontal guide bar 50 is slideably mounted on the guide rods 49 for guidance thereby and is attached to the cross bar 43. Blow pin actuating fluid cylinder 51 is mounted on the upper cross member 47 and has its piston rod fixed to the cross bar 43. A microswitch D is mounted on one upright member 24 and has its contact wheel 52 in alignment with one end of horizontal guide bar 50 such that the contact wheel 52 is contacted and depressed by the horizontal guide bar 50 to actuate the microswitch D when said guide bar moves downwardly.

Referring now to FIG. 16, a pressurized fluid system is shown as comprising a manifold 53 connected to a supply of pressurized fluid. The knife actuating fluid cylinder 15 is connected through a 4-way valve 54 to the manifold 53. The finger actuating fluid cylinders 28 are of the spring loaded type requiring fluid pressure to move the fingers 30 towards each other and requiring release of the fluid pressure to enable the spring bias to move the fingers 30 away from each other. Both finger actuating cylinders are connected to the manifold 53 through one side of a 4-way valve 55. The carriage actuating cylinder 34 is connected to the manifold 53 through a 4-way valve 56. Each mold actuating cylinder 40 is connected to the manifold 53 through a 4-way valve 57. The blow pin actuating cylinder 51 is connected to the manifold 53 through a 4-way valve 58. The blow pin 42 is connected to the manifold 53 through a 4-way valve 59.

Referring now to FIG. 17, the control system and operation of the embodiment hereinbefore described will now be set forth. The electric eye transmitter and receiver 10 controls normally open switch NO which is interposed in the circuit for the in solenoid of 4-way valve 55 and the microswitch E is interposed in the circuit of the out solenoid of 4-way valve 55 such that when the electric eye circuit is broken by the parison the switch NO is closed to energize the in solenoid of 4-way valve 55 thereby supplying air to the finger actuating cylinder 28. At a subsequent point in the operation, after the parison has been moved out of the electric eye circuit to reopen the switch NO and when the mold half 36 returns to its associated cylinder to cause double contact arm 41 to close microswitch E, the out solenoid of 4-way valve 55 is energized to connect the finger actuating cylinders 28 to exhaust thereby enabling the spring bias of said cylinders to move the fingers away from each other.

The microswitch B is interposed in the circuits of the right and left solenoids of 4-way valve 54 such that when said microswitch is closed one or the other of said solenoids is actuated to move the knife member 16. Actuation of the right or left solenoid of 4-way valve 54 is determined by a latching relay which is controlled by microswitches A and F. Thus, when the knife member 16 is in its right position the microswitch A is closed such that upon closing of microswitch B the left solenoid of 4-way valve 54 is actuated to move the knife member 16 to the left and thereby also open microswitch A. The latching relay prevents the circuit from closing through the right solenoid of 4-way valve 54 until the complete cycle of operation has been performed and microswitch F is closed. When this occurs, the right solenoid is placed in energizable condition and will be energized when microswitch B is closed on the next cycle of operation.

The microswitch B is also interposed in the circuit of the move-to-mold solenoid of the 4-way valve 56 such that when microswitch B is closed the carriage actuating cylinder 34 is pressurized to move the carriage assemblies 25 to the mold.

Microswitch C is interposed in the circuit of the blow pin lowering solenoid of 4-way valve 58 such that when closed said solenoid is energized to pressurize the blow pin actuating cylinder 51 to lower the blow pin 42. The microswitch D is interposed in the circuit of the mold closing solenoid of valve 57 and also is in series with microswitch C such that upon lowering of the blow pin 42 microswitch D is closed to actuate the mold actuating cylinders 40 to close the molds. Upon closing of the molds, microswitch E is closed to energize the out solenoid of valve 55 thereby moving the fingers 30 away from each other. In so doing, microswitch F is closed and being interposed in the circuit of the move to parison solenoid of valve 56, said solenoid is energized to cause the carriage assemblies to return to the parison. The closing of microswitch E also energizes the blow solenoid of valve 59 to supply pressurized fluid to the blow pin 42. In addition, the closing of microswitch E starts timers A and B by energizing the respective timer motors TM and TM-A and the respective timer relays TR and TR-A, thereby closing the respective relay switches CTR-B and CTR-A. After the timers have run their courses, the timed to open contacts T-0 of each timer are opened to de-energize the timer relay thereby opening the timer relay switches CTR-A and CTR-B to permit said timers to reset. At the same time the timed to close contacts CT-A and CT-B are closed thereby respectively energizing the exhaust solenoid of valve 59 to connect the blow pin 42 to exhaust and to energize the open solenoid of valve 57 thereby causing the mold halves to move away from each other. When the mold halves move away from each other, microswitch G is closed to energize the blow pin raise solenoid of valve 58 and thus raise the blow pin 42.

In summary, the parison interrupts the electric eye circuit to close the switch NO which causes fingers 30 to move inwardly and grip the parison. When the fingers 30 move inwardly, microswitch B is closed to move the knife member 16 to sever the parison from that being extruded from the extrusion nozzle 2. Also, the closing of microswitch B causes the carriage to move the parison to a position between the mold halves. When this happens, microswitch C is closed to cause the blow pin 42 to lower and insert within the parison. As the blow pin 42 moves downwardly, microswitch D is closed to cause the mold halves to move towards each other. When the mold halves have closed, the microswitch E is closed to cause the fingers 30 to move away from each other and release the parison. When the fingers 30 move away from each other, microswitch F is closed to cause the carriage assemblies 25 to move back to the parison being extruded from the extrusion nozzle 2. The closing of microswitch F also actuates the latching relay to permit resetting of the solenoid circuits of valve 54. The microswitch E on closing also causes pressurized fluid to be supplied to the blow pin 42 to expand the parison to the confines of the closed mold halves 36, thus forming a hollow article. The closing of microswitch E also starts the timers A and B which, after running their courses permitting sufficient time for the hollow article to cool and set, close timed to close switches CTA which then connects the blow pin to exhaust and CTB which causes the molds to move away from each other. When the molds have substantially completely retracted, the microswitch G is closed to cause the blow pin 42 to raise. In raising, the blow pin 42, in most cases, carries the hollow article upwardly until said hollow article reaches the bearing 44 and bracket 45 which serve to strip the hollow article from the blow pin 42.

FIG. 18 illustrates an alternative control system wherein the timers may be dispensed with and all of the microswitches can be gathered into a compact control unit. This control system comprises a synchronous motor 60 which rotates a series of cams 61 all keyed to a common shaft. Each of the cams 61 is so formed as to provide the sequence of operations as hereinbefore described.

Figure 19:
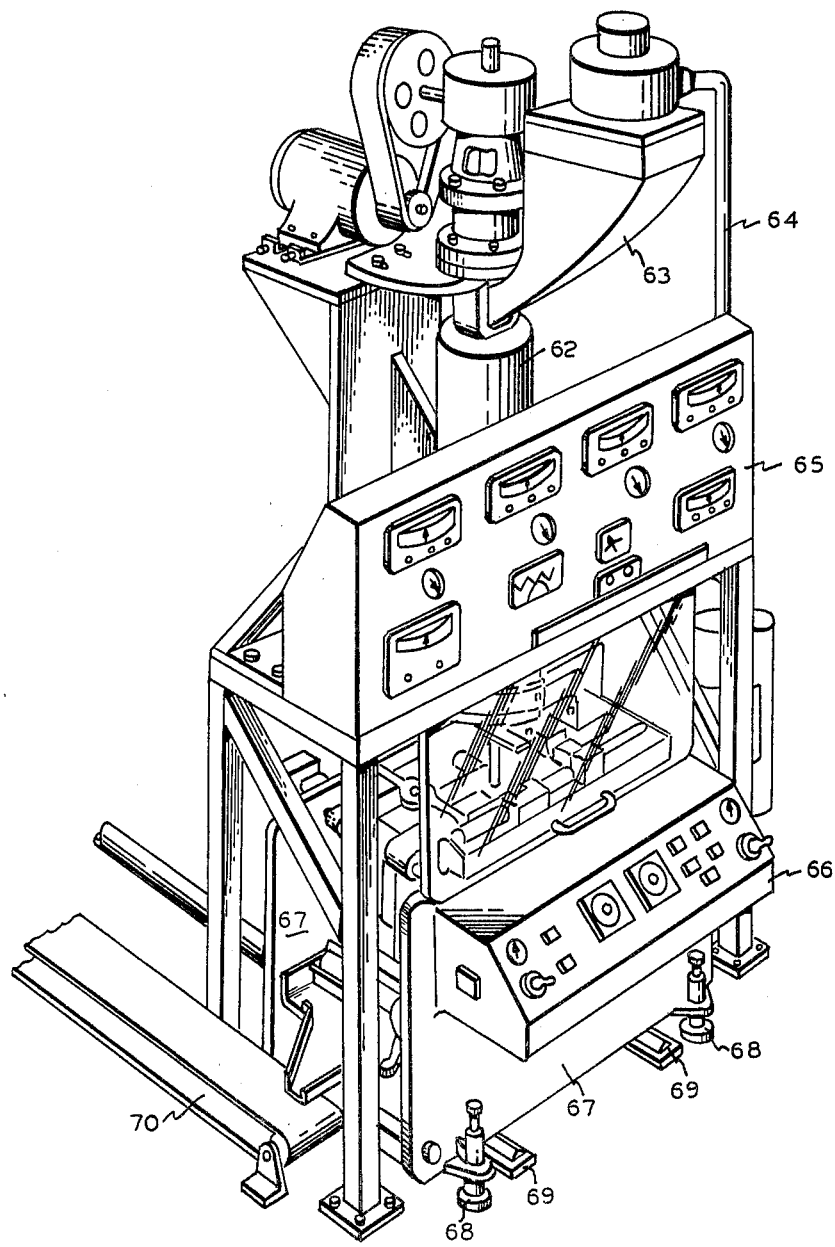

FIG. 19 illustrates a type of blow molding machine of this invention having two sets of molds and employing a vertical extruder 62. In this embodiment, the vertical extruder 62 is fed by a hopper 63 having an automatic feed attachment 64. An upper control panel 65 contains the temperature controls for the extruder and nozzle and the temperature controls for the cooling system employed for chilling the molds. A lower control panel 66 houses the electrical controls for the cutting assembly, gripping finger assembly, carriage assembly, mold assembly, and blow pin assembly of the machine. The upper and lower control panels 65 and 66 are rigged for easy removal to permit substitution with an operable control panel if, as, and when defects arise in the control panels during use. The gripping finger assembly, carriage assembly, and mold assembly are all mounted on a pair of main platens 67 stabilized by jacks 68 and movable on wheels (not shown) attached to the under side thereof which wheels cooperate with tracks 69. The tracks 69 extend behind the machine such that if the gripping finger assembly, carriage assembly and/or mold assembly develop faults during operation or if it is desired to change the molds being employed so as to switch from the production of one type of hollow article to another type of hollow article, the jacks 68 are raised to drop the wheels mounted on the main platens 67 onto the tracks 69. The unit is then wheeled backwards for a sufficient distance to permit the placement of a new unit on the tracks 69. The new unit is then wheeled into position under the extruder 62 and the stabilizing jacks 68 are lowered to stabilize the unit. A conveyor belt 70 and cooperating delivery chute 71 are also provided.

Figure 20:
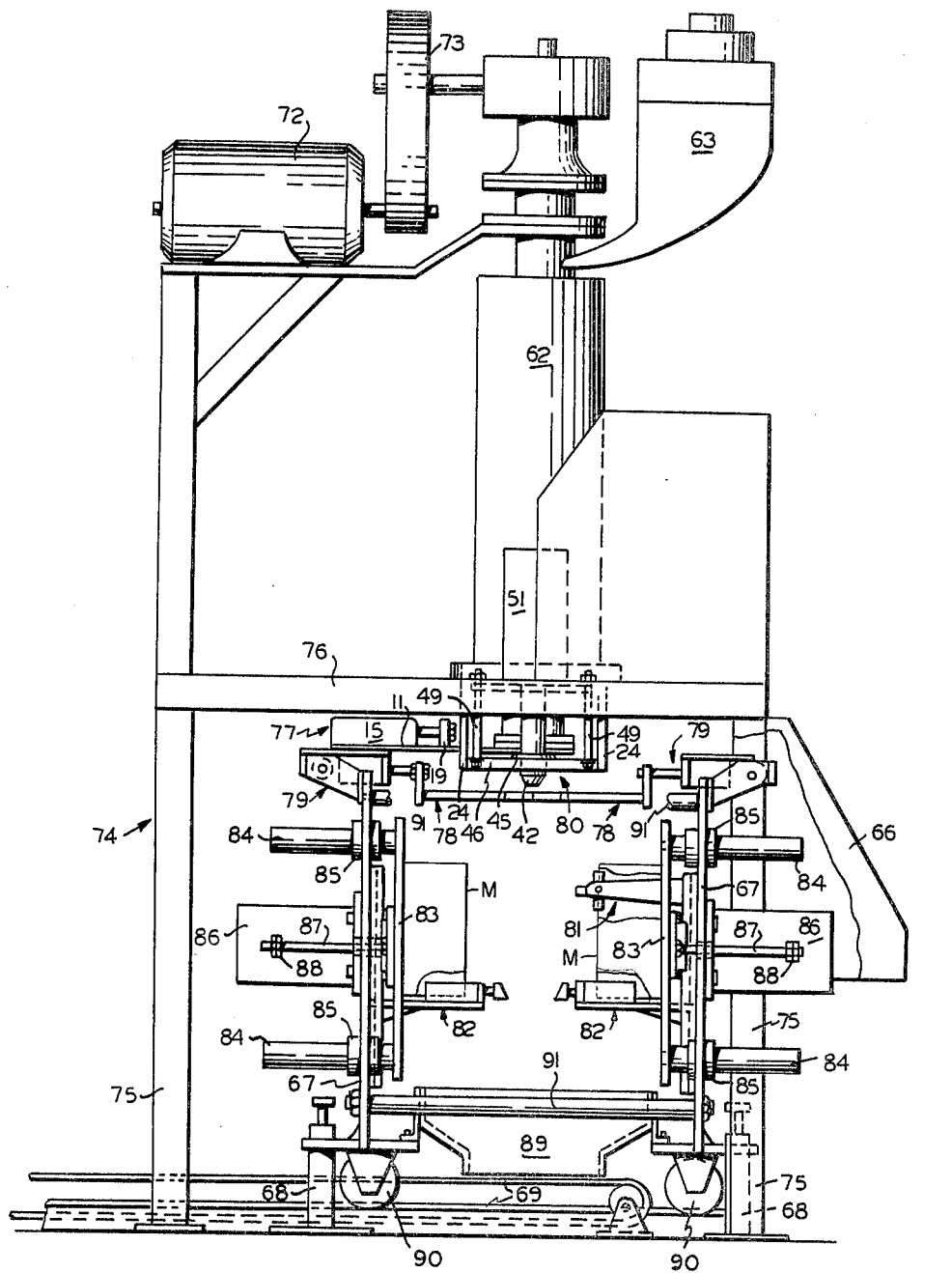
Figure 21:
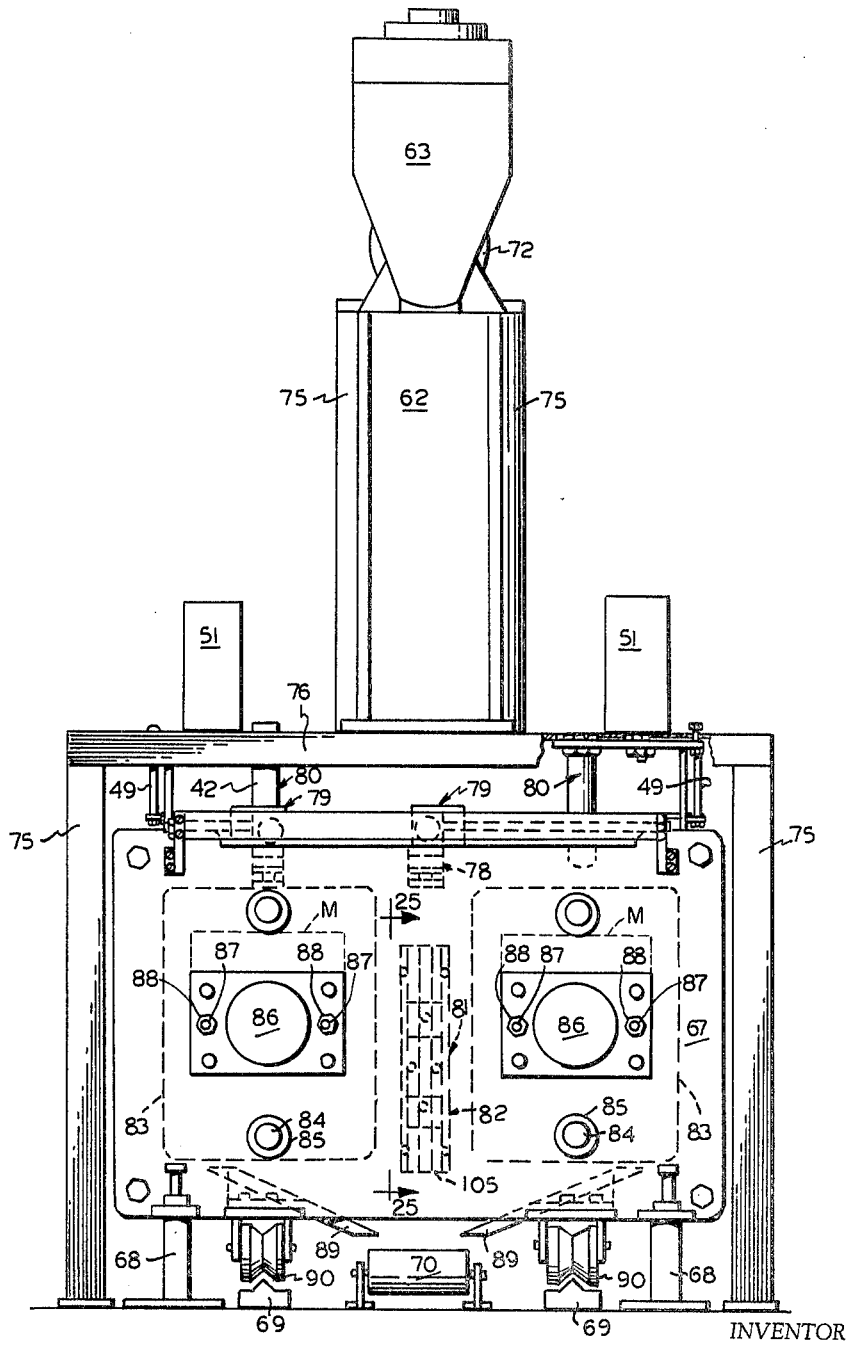

FIGS. 20 and 21 illustrate in detail a type of machine similar to that shown in FIG. 19. There is thus shown in FIGS. 20 and 21 the vertical extruder 62 fed by a hopper 63 and actuated by an electric motor 72 and a suitable drive train 73. The machine is formed with a frame 74 having vertical legs 75 and a platform 76 raised at a distance from the floor level.

The cutting assembly is designated by reference numeral 77, the gripping finger assemblies by reference numeral 78, the carriage assemblies by reference numeral 79, the blow pin assemblies by reference numeral 80, the electrical eye transmitter by reference numeral 81, and bumper assemblies by reference numeral 82. The mold halves M are shown in FIGS. 20 and 21; partially cut away in FIG. 20 for simplicity of illustration. The mold half move assembly comprises two pairs of movable plates 83, each of which is mounted on a main platen by means of a pair of guide shafts 84 which cooperate with bushings 85 mounted in bores provided thereof in the main platen. Portions of the lower control panel 66 and of a front vertical leg 75 are cut away to simplify the illustration of the internal components. Mold half moving fluid cylinders 86 are mounted on the outer sides of the platens 67 and have piston rods which extend through suitable bores in said platens provided therefor and which are connected to a movable plate 83. Guide and limit rods 87 are connected to each plate 83 on either side of the corresponding cylinders 86 and freely pass through holes in the main platens 67. The guide and limit rods 87 have lock nuts 88 mounted on their outer ends. The mold halves are mounted on the plates 83 by suitable means such as bolts which engage suitable threaded holes in said plates. As best seen by reference to both FIGS. 20 and 21, two pairs of opposing mold halves are employed, each mold half having its own individual movable plate 83 to which it is attached.

Each pair of opposing plates 83 has disposed beneath it a delivery chute 89 and each lower end portion of each platen 67 mounts a V-groove wheel 90. The delivery chutes 89 are positioned to deliver to the center of the machine where a conveyor belt 70 is mounted. The main platens 67 are spaced from each other and connected to each other by means of tie rods and spacing tubes 91 mounted between the corresponding corners of said platens.

FIGS. 22, 23, and 24 illustrate in detail the gripping finger assemblies 78 and the carriage assemblies 79. Each gripping finger assembly comprises a pair of gripping fingers 92 each of which is mounted on a finger plate 93. A top plate 94 mounts a finger actuating fluid cylinder 95 on its under side and also mounts a guide plate 96 on its inner end. There are four top plates 94, cylinders 95, and guide plates 96 provided, one for each finger. The piston rod of each cylinder 95 is connected to a finger plate 93. A pair of guide pins 97 is mounted on each guide plate 96 and extends through suitable bushings 98 disposed in suitable holes provided in each finger plate 93.

The carriage assembly 79 comprises a carriage actuating fluid cylinder 99 having two piston rods 100 extending from the ends thereof such that air introduced into one end of said cylinder will move the piston rod extending from that end inwardly of said cylinder and move the piston rod extending from the opposite end outwardly of said cylinder. The top plates 95 of the gripping finger assembly 78 are adustably mounted on each end of each fluid cylinder 99 by means of screws 101. On the lateral outer sides of each end of the cylinder 99 is mounted a bearing plate 102 of a suitable lubricating solid, such as Teflon.

A back plate 103 is mounted by means of brackets 104 to the outer sides of each main platen 67. The piston rods 100 of each cylinder are fixed to a bracket 104 at each end of the back plate 103 such that the bearing plates 102 of each cylinder 99 are caused to bear against the inner lateral side of said back plate by the moment of the gripping finger assemblies pivoting said assemblies about the piston rod 100 as an axis. The back plates 103 and brackets 104 are mounted on the platens 67 at an intermediate point such that when the cylinders 99 have traveled to substantially the right hand end of the back plates 103, the right hand pair of fingers 92 is disposed over a pair of mold halves and the left hand pair of fingers 92 is positioned directly beneath the extruder 62 and when the cylinders 99 have traveled to substantially the left hand end of back plates 103, the left hand fingers 92 are disposed over the pair of mold halves to the left of the extruder 62 and the right hand fingers 92 are disposed directly below the extruder 62. The platens 67, if necessary, can be recessed under the cylinders 95 to permit suitable clearance as said cylinders travel from one end of the back plates 103 to the other.

FIGS. 25 through 29 illustrate in detail the bumper assemblies 82 and the electric eye transmitter and receiver assembly 81. A pair of T-groove tracks 105 is vertically mounted in opposing fashion on the inner sides of main platens 67 at an intermediate point, as best shown in FIG. 21. The electric eye assembly 81 comprises an adustment plate 106 adapted to ride in the T-groove of track 105 and has mounted thereon a forked bracket 107 which is slideable in the T-groove track 105. A set screw 108 is provided through the adjustment plate 106 for holding said adjustment plate and forked bracket 107 in the desired vertical position relative to said track and the platen 67. The forked bracket 107 has pivotally mounted between its outer arms a scanner holder 109. An electric eye scanner 110 is held in a suitable bore provided in the scanner holder 109. This arrangement permits the scanner 110 to be directed and focused at various points along a vertical line. The track 105 is so positioned that the scanner 110 can be focused at a point beyond parison as it is downwardly extruded from the extruder 62.

Each bumper assembly 82 comprises an adjustment plate 111 adapted to slideably ride in the T-groove of the tracks 105, and a platform bracket 112 mounted on each adjustment plate 111 for slideable movement in the T-groove of said tracks. Each adjustable plate 111 is provided with a set screw passing therethrough to bear against the respective platen 67 to hold said adjustment plate and platform bracket 112 in a desired vertical position. Each platform bracket 112 has a bumper actuating fluid cylinder 114 mounted thereon and a bumper 115 is mounted on the piston rod of each cylinder 114. A guide plate 116 is mounted on the outer end of each platform bracket 112 and the piston rods of the cylinders 114 pass therethrough for connection to the bumpers 115. Guide pins 117 are fixed to the guide plate 116 and are slideable in bores 118 provided in said bumpers. The bumpers 115 are in alignment with each other and are so positioned that when the respective cylinders 114 move the bumpers towards each other, said bumpers will contact and constrict parison being extruded from the extruder 62.

The cutting assembly 77 can be essentially the same as that described in connection with FIGS. 3 through 8 or it can be of an alternate type as will be hereinafter described in reference to FIGS. 33 and 34.

The blow pin assembly 80 is substantially the same as the blow pin assembly 7 described in conjunction with FIGS. 14 and 15.

Referring now to the pneumatic diagram shown in FIG. 30, compressed fluid is supplied to an air manifold 119. The knife actuating fluid cylinder 15 is connected to the manifold 119 through a 4-way valve 120. The two pairs of finger actuating fluid cylinders are spring loaded and are connected to the manifold through one side of a 4-way valve such that when fluid pressure is applied to said cylinders, the fingers 92 move towards each other and when fluid pressure is released, the spring bias of said cylinders moves said fingers away from each other. The left hand pair of finger actuating cylinders 95 is connected to the manifold through one side of a 4-way valve 121 and the right hand pair of cylinders 95 is connected to the manifold through one side of a 4-way valve 122. Both carriage actuating fluid cylinders 99 are connected to the manifold through a 4-way valve 123. The left hand pair of mold half actuating fluid cylinders 86 is connected to the manifold through a 4-way valve 124 and the right hand pair of mold half actuating fluid cylinders 86 is connected to the manifold through a 4-way valve 125. The left hand blow pin 42 is connected to the manifold through one side of a 4-way valve 126 and the right hand blow pin 42 is connected to the manifold through one side of a 4-way valve 127. The left hand blow pin actuating fluid cylinder 51 is connected to the manifold through a 4-way valve 128 and the right hand cylinder 51 is connected to the manifold through a 4-way valve 129. The bumper actuating fluid cylinders are of the spring loaded type such that when pressurized fluid is supplied to them the bumpers 115 are caused to move towards each other. When the pressurized fluid is released, the spring bias of said cylinders causes said bumpers to move away from each other. The bumper actuating fluid cylinders 114 are connected to the air manifold through one side of a 4-way valve 130.

Figure 31:
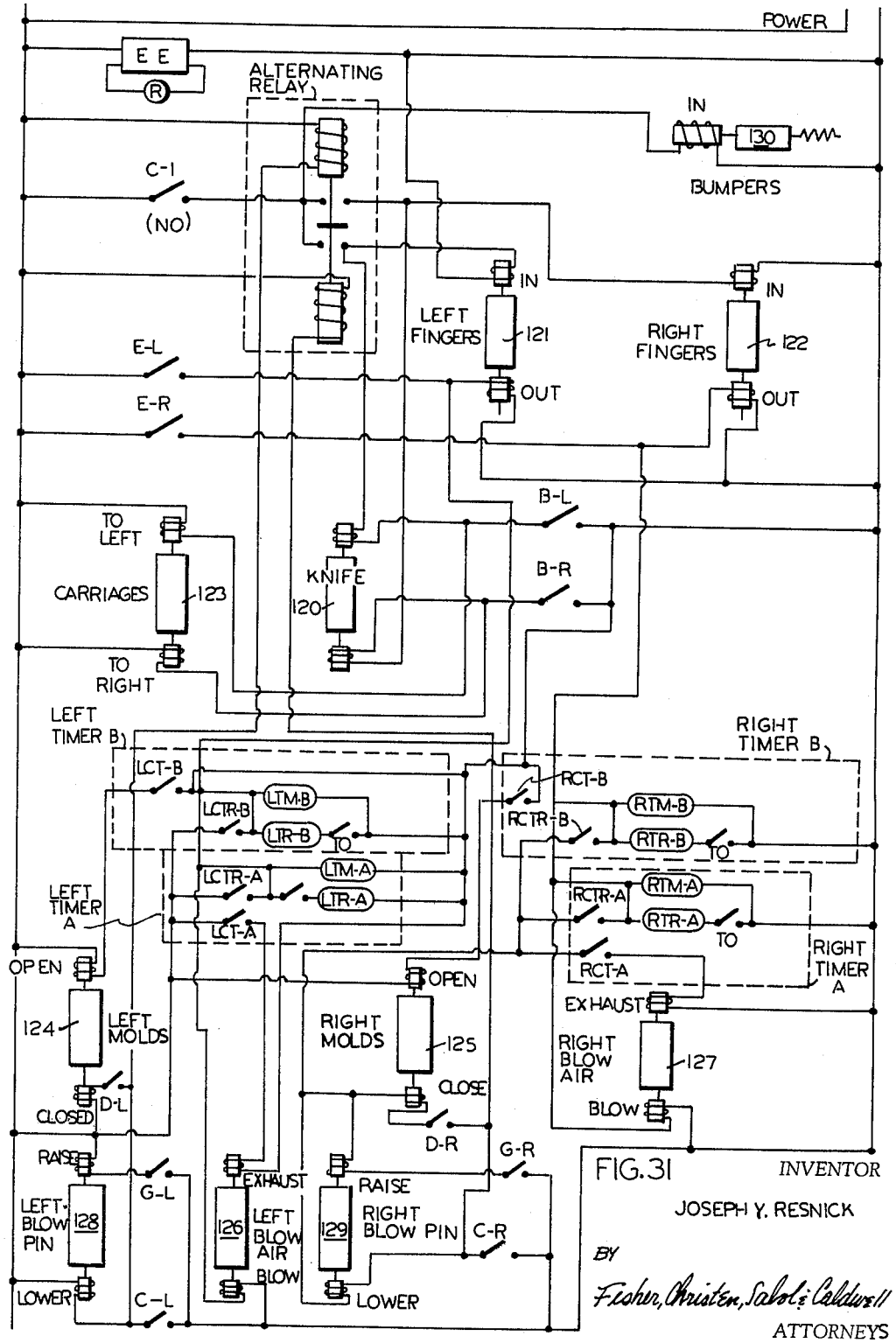
FIG. 31 is a wiring diagram illustrating a control system for the embodiment shown in FIGS. 19, 20, and 21.

The wiring diagram illustrating the electrical control system is shown in FIG. 31 and will be described in conjunction with the operation of the embodiment shown in FIGS. 19 through 30. Assuming that the carriage assembly 79 is in its right hand position, the lower contacts of the alternating relay are bridged. When the parison being extruded by the extruder 62 reaches the point where it is interposed between the scanner 110 and its point of focus, the electric eye circuit EE is broken to deactivate relay R and to close contacts C–1, thereby energizing the solenoid of valve 121 to move the left hand fingers inwardly towards each other. At the same time, the in solenoid of valve 130 is energized to cause the bumpers to come together pinching the lower end of the parison. Still at the same time, a solenoid of the valve 120 is placed in energizable condition and when the left fingers move inwardly they close a microswitch B–L to thereby energize the solenoid of valve 120 to cause the knife to move and cut the parison at the extruder 62. The closing of microswitch B–L also energizes the move to the left solenoid of valve 123 to cause the carriage actuating cylinder 99 to move the carriage assembly 79 and finger assembly 78 to the left. When the carriage assembly 79 reaches the left hand position, it closes a microswitch G–L which energizes the lower solenoid of valve 128 to cause the left hand blow pin 42 to descend and enter the parison. When the said blow pin descends, it closes microswitch D–L which energizes the close solenoid of valve 124 to cause the left hand mold halves to close. When the left hand molds reach the closed position, they close a microswitch E–L which energizes the out solenoid of valve 121 to cause the left hand fingers to move away from each other and release the parison. The closing of microswitch E–L energizes the blow solenoid of valve 126 to connect the blow pin 42 to pressurized fluid. In addition, the closing of the microswitch E–L starts the timer motors LTM–A and LTM–B and actuates the timer relays LTR–A and LTR–B, thereby closing the timer relay contacts LCTR–A and LCTR–B. After a predetermined time has run, the respective timed to open contacts TO of the timers open to permit the timers to reset and the respective timer contacts LCT–A and LCT–B close. The contacts LCT–B energize the open solenoid of valve 124 to cause the left hand molds to open and the closing of the contacts LCT–A energizes the exhaust solenoid of valve 126 to cause the left hand blow pin to be connected to exhaust. When the mold halves open, they close microswitch G–L to energize the raise solenoid of valve 128 to cause the left hand blow pin to raise. In raising, the hollow article formed is stripped from the blow pin when it contacts the fixed bearing 44 and/or bracket 45. The closing of microswitch C–L energizes the upper solenoid of the alternating relay to bridge the upper contacts of said relay and thereby place the in solenoid of valve 122 in energizable condition. It also places the other solenoid of valve 120 in energizable condition for subsequent movement of the knife across the extrusion orifice of the extruder 62.

The rate of extrusion of extruder 62 and the functions set forth above are timed to substantially synchronize such that the extruder supplies a parison just short of interposing between the point of focus and the scanner 110 when the left hand molds are closed thereby moving the left hand fingers away from each other to permit movement of the carriage assemblies to the right hand position. Thus, when the electric eye circuit is broken by the parison, contacts C–1 close thereby energizing the in solenoid of valve 122 to move the right hand fingers toward each other to grip the parison. At the same time, the in solenoid of valve 130 is energized to bring the bumpers 115 together thereby pinching the lower end of the parison. In addition, the closing of C–1 places the lower solenoid of valve 120 in energizable condition. When the fingers close they contact microswitch B–R to energize the lower solenoid of valve 120, thereby causing the knife to move across the extrusion orifice and cut the parison. At the same time, the closing of B–R energizes the move to right solenoid of valve 123 to cause the carriage assembly and fingers to move to the right hand position. Upon reaching this position, the microswitch C–R is closed, thereby energizing the lower solenoid of valve 129 to cause the right hand blow pin to descend and enter the parison being held between right hand fingers. In descending, the right hand blow pin closes microswitch D–R, thereby energizing the close solenoid of valve 125 to cause the right hand mold halves to close. Upon reaching the closed position, the right hand mold halves close microswitch E–R which then energizes the out solenoid of valve 122 to move the right hand fingers away from each other releasing the parison. In addition, the closing of E–R energizes the blow solenoid of valve 127 to connect the right hand blow pin with pressurized fluid. In addition, E–R starts the right timers A and B. After running their course, the timers A and B, respectively, close timer contacts RCT–A and RCT–B. The closing of RCT–B energizes the open solenoid of valve 125 to cause the right hand mold halves to move away from each other. The closing of RCT–A energizes the exhaust solenoid of valve 127 to connect the right hand blow pin to exhaust. When the mold halves reach their open position, microswitch G–R is closed to energize the raise solenoid of valve 129 to raise the right hand blow pin, whereupon the hollow article formed is stripped from the blow pin by the fixed bearing 44 and/or bracket 45.

Figure 32:
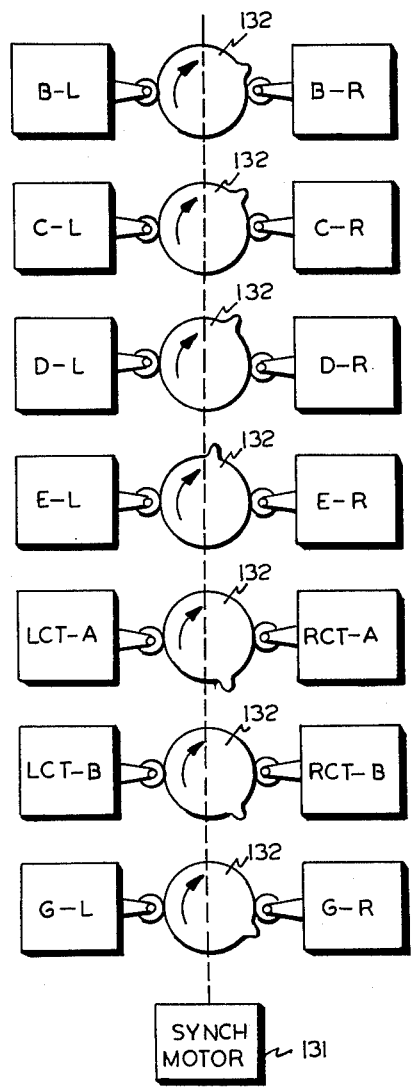
FIG. 32 is a schematic diagram illustrating a cam system for actuating the microswitches of the control system shown in FIG. 31.

FIG. 32 illustrates an alternative control system where the timers may be dispensed with and all of the microswitches can be gathered into a compact control unit. This control system comprises a synchronous motor 131 which rotates a series of cams 132 all keyed to a common shaft. Each of the cams 132 is so formed as to provide the sequence of operations as hereinbefore described.

FIGS. 33 and 34 illustrate an alternative cutting assembly which can be substituted for the cutting assemblies hereinbefore described. The alternate cutting assembly comprises main frame 133 having horizontal channels 134 which slideably accommodate a slide plate 135. The main frame 133 has mounted thereon two pairs of copper contacts 136 which are connected to a 12-volt supply. The slide plate 135 has a central cut-out 137 through which the parison from the extruder passes. An electrically conductive knife blade 138 is mounted on the slide plate 135 and extends across the cut-out 137. The slide plate 135 is made of insulating material and the copper contacts are so positioned that the knife blade 138 makes contact with a pair of said contacts at each side of the length of travel of said slide plate in the channels 134 of the main frame 133. The slide plate 135 has an upright bracket 139 mounted at one end thereof, which bracket is attached to the piston rod of a knife actuating fluid cylinder 15. This alternate cutting assembly enables the use of a hot knife blade to cut the parison without any danger of shorting through the extrusion nozzle.

It is advantageous to set the respective timers A and B or the respective cams for the contacts CT–A, CT–B or LCT–A, LCT–B, and RCT–A and RCT–B to open the mold halves prior to connecting the blow pin to exhaust. This provides blowing for a short period of time after the mold halves have separated and facilitates stripping of the hollow article from the blow pin.

The mold halves, in all instances, are provided with internal channel means for supplying a chilled fluid to cool the mold halves and accelerate setting of the hollow article formed therein by blowing. Many types of plastics can be employed in the machines and methods of this invention to form hollow articles. Illustrations of suitable thermoplastic materials include polyethylene, polystyrene, polypropylene, polyvinyl chloride, polyvinyl acetate, copolymers of vinyl chloride and vinyl acetate, and the like.

The bumper assemblies 82, as shown in FIGS. 20, 21, 25, 26, and 27, can be employed on the apparatus shown and described in relation to FIGS. 1 through 15. Similarly, the timers A and B shown in the wiring diagram of FIG. 17 for the embodiment shown in FIGS. 1 through 15 are preferably so set that timer A opens the molds a short time, e.g., about two seconds, prior to the time when the timer B connects the blow pin to exhaust. This arrangement permits blowing for a short time after the molds have opened and thus facilitates the release and stripping of the formed hollow article from the blow pin. The electric eye assembly employed in the embodiment shown in FIGS. 19 through 32 can be of the type shown in FIGS. 1 and 2, wherein an electric eye receiver is situated on one side of the parison and an electric eye transmitter is positioned on the opposite side of the parison and aligned with said receiver.

What is claimed is:

1. A machine for blow molding hollow articles comprising means for substantially continuously supplying tubing of plastic material in a condition of plasticity to permit expansion and setting in predetermined form, means for gripping a predetermined length of said tubing, means for severing said length from said tubing being supplied adjacent said gripping means in a manner to provide an open end to said length adjacent said gripping means, partible mold means positioned laterally adjacent said supplying means for enclosing said length of tubing, means for moving said gripping means after said length has been severed from said tubing being supplied to dispose said length gripped thereby in said mold means, and blowing means insertable through said open end into the interior of said length of tubing for expanding said length of tubing to the confines of said mold means, and means for closing said molds after said blowing means has been inserted into said tubing.

2. A machine for blow molding hollow articles comprising means for substantially continuously supplying tubing of plastic material in a condition of plasticity to permit expansion and setting in predetermined form, means for gripping a predetermined length of said tubing, means for severing said length from said tubing being supplied adjacent said gripping means in a manner to provide an open end to said length adjacent said gripping means, partible mold means positioned laterally adjacent said supplying means for enclosing said length of tubing, means for moving said gripping means after said length has been severed from said tubing being supplied to dispose said length gripped thereby in said mold means, blowing means insertable into the interior of said length of tubing for expanding said length of tubing to the confines of said mold means, and means for actuating said gripping means to release said length after said blowing means has been inserted into the interior of said length of tubing.

3. A machine for blow molding hollow articles comprising means for substantially continuously supplying tubing of plastic material in a condition of plasticity to permit expansion and setting in predetermined form, means for gripping a predetermined length of said tubing, means disposed between said gripping means and said supplying means for severing said length from said tubing being supplied in a manner to provide an open end to said length adjacent said gripping means, mold means positioned laterally adjacent said supplying means for enclosing said length of tubing, means for moving said gripping means after said length has been severed from said tubing being supplied to dispose said length gripped thereby in said mold means, blowing means insertable through said open end into the interior of said length of tubing for expanding said length of tubing to the confines of said mold means to form a hollow article, and conveying means for conveying said hollow article from said mold means.

4. A machine for blow molding hollow articles comprising means for substantially continuously supplying tubing of plastic material in a condition of plasticity to permit expansion and setting in predetermined form, means for gripping a predetermined length of said tubing, means disposed between said gripping means and said supplying means for severing said length from said tubing being supplied in a manner to provide an open end to said length adjacent said gripping means, mold means positioned laterally adjacent said supplying means for enclosing said length of tubing, means for moving said gripping means after said length has been severed from said tubing being supplied to dispose said length gripped thereby in said mold means, blowing means insertable through said open end into the interior of said length of tubing for expanding said length of tubing to the confines of said mold means, and a frame mounting said gripping means, said mold means, and said means for moving said gripping means.

5. The machine as claimed in claim 4 wherein said frame is provided with wheels permitting movement of said frame away from the remaining parts of said machine.

6. The machine as claimed in claim 5 wherein said frame is provided with releasable stabilizing means for stabilizing said frame when said gripping means, mold means, and means for moving said gripping means are in use.

7. A machine for blow molding hollow articles comprising means for substantially continuously downwardly supplying tubing of plastic material in a condition of plasticity to permit expansion and setting in predetermined form, means for gripping a predetermined length of said tubing at an upper portion thereof, means for severing said length from said tubing being supplied adjacent said gripping means in a manner to provide an open upper end to said length adjacent said gripping means, partible mold means positioned laterally adjacent said supplying means for enclosing said length of tubing, means for moving said gripping means after said length has been severed from said tubing being supplied to dispose said length gripped thereby in said mold means, and blowing means insertable through said open upper end into the interior of said length of tubing for expanding said length of tubing into the confines of said mold means.

References Cited by the Examiner

UNITED STATES PATENTS

| | | |
|---|---|---|
| 2,783,503 | 3/1957 | Sherman. |
| 2,943,348 | 7/1960 | Mumford et al. _____ 18—5 |
| 2,978,745 | 4/1961 | Langecker _____ 18—5 X |
| 3,000,051 | 9/1961 | Sehaich _____ 18—5 X |
| 3,005,231 | 10/1961 | Pechthold _____ 18—5 |
| 3,008,191 | 11/1961 | Park. |
| 3,069,722 | 12/1962 | Takeo Kato _____ 18—5 |
| 3,081,489 | 3/1963 | Jackson et al. _____ 18—5 |

FOREIGN PATENTS 1,261,774  4/1961  France.

J. SPENCER OVERHOLSER, *Primary Examiner.*

MICHAEL U. BRINDISI, WILLIAM J. STEPHENSON,
*Examiners.*